Sept. 3, 1940.                L. H. FACER                 2,213,243
           PROCESS FOR PRODUCING SUPERPHOSPHATE FERTILIZERS
                      Filed Aug. 27, 1936              4 Sheets-Sheet 1
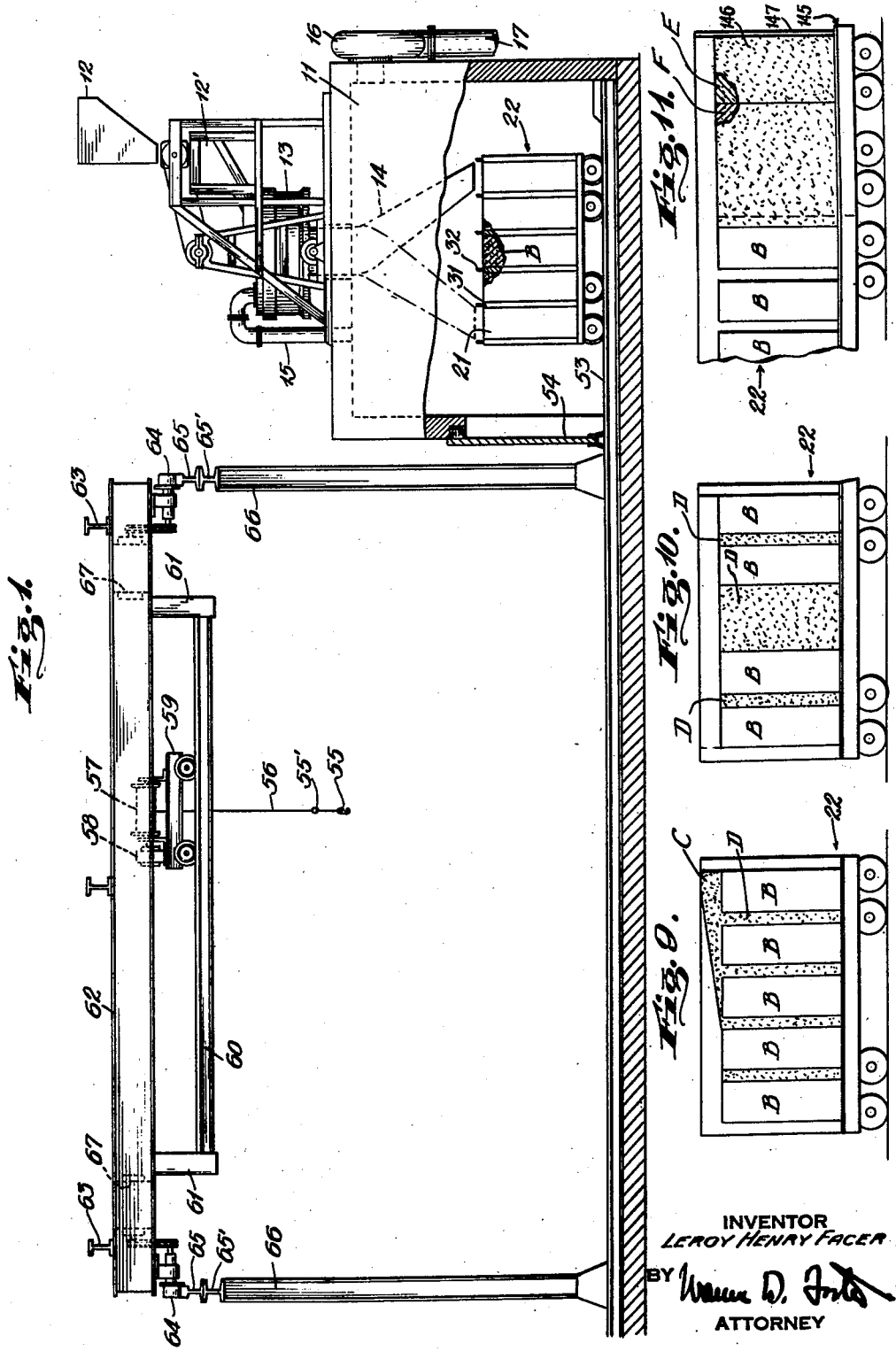
INVENTOR
LEROY HENRY FACER
BY
ATTORNEY

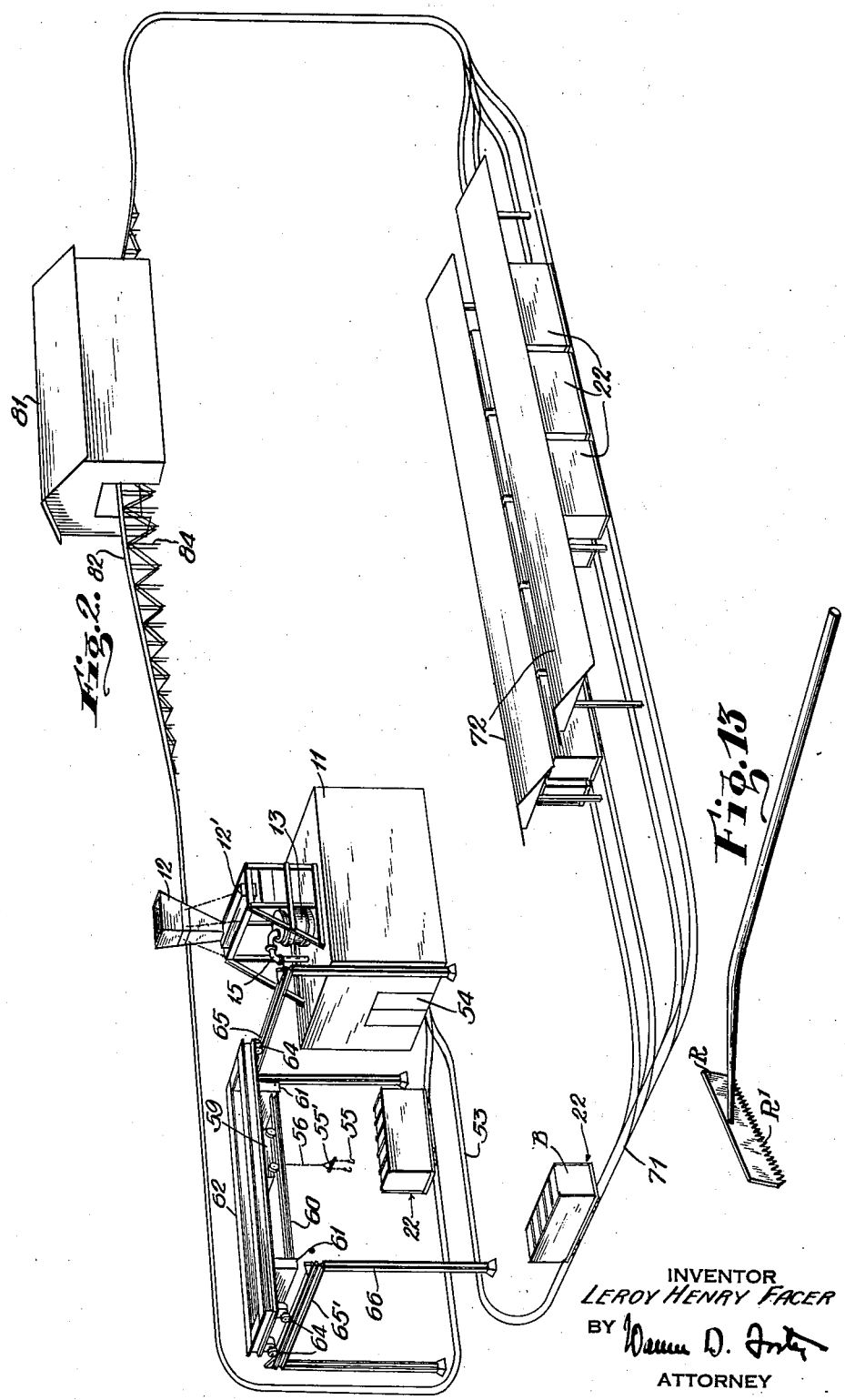

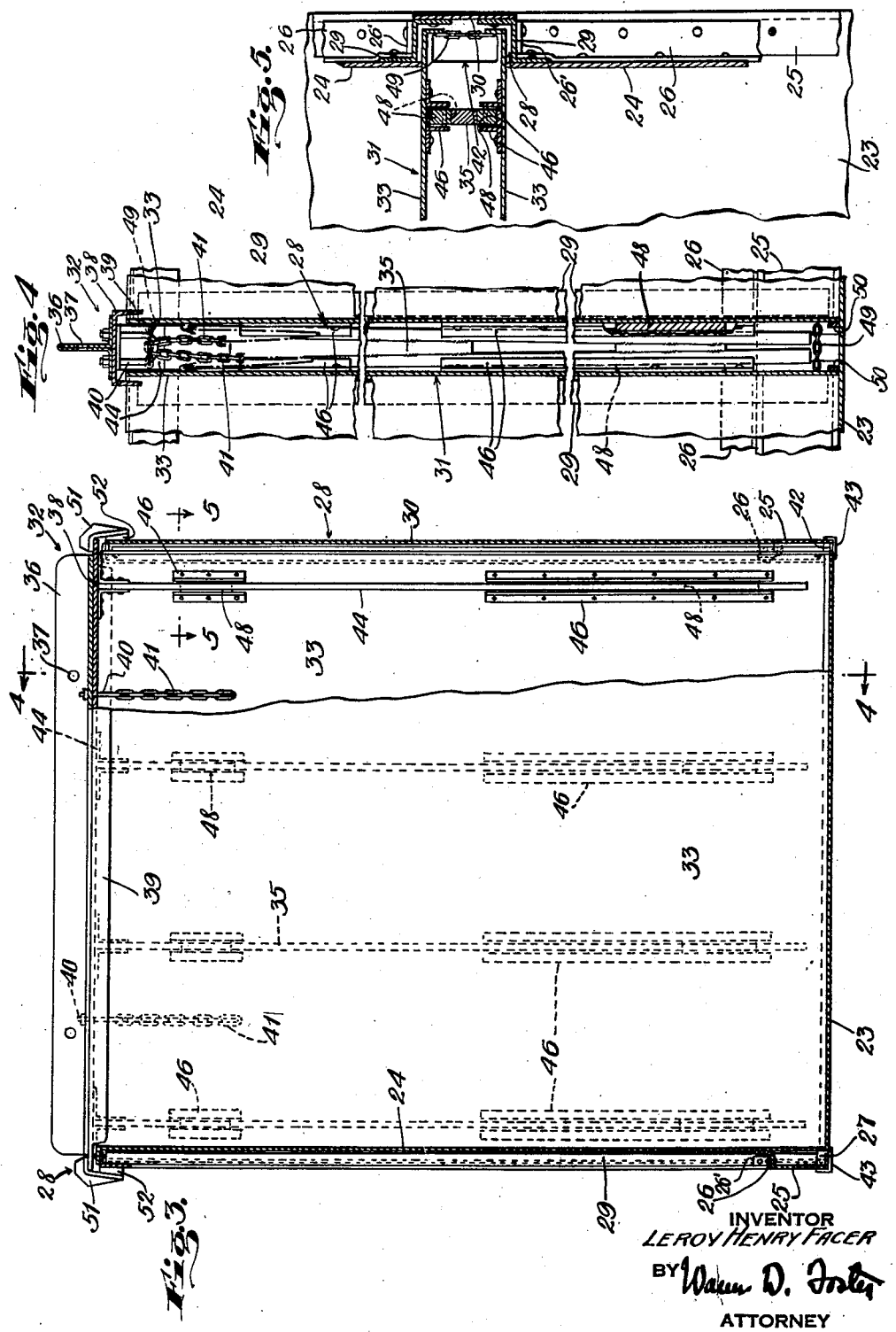

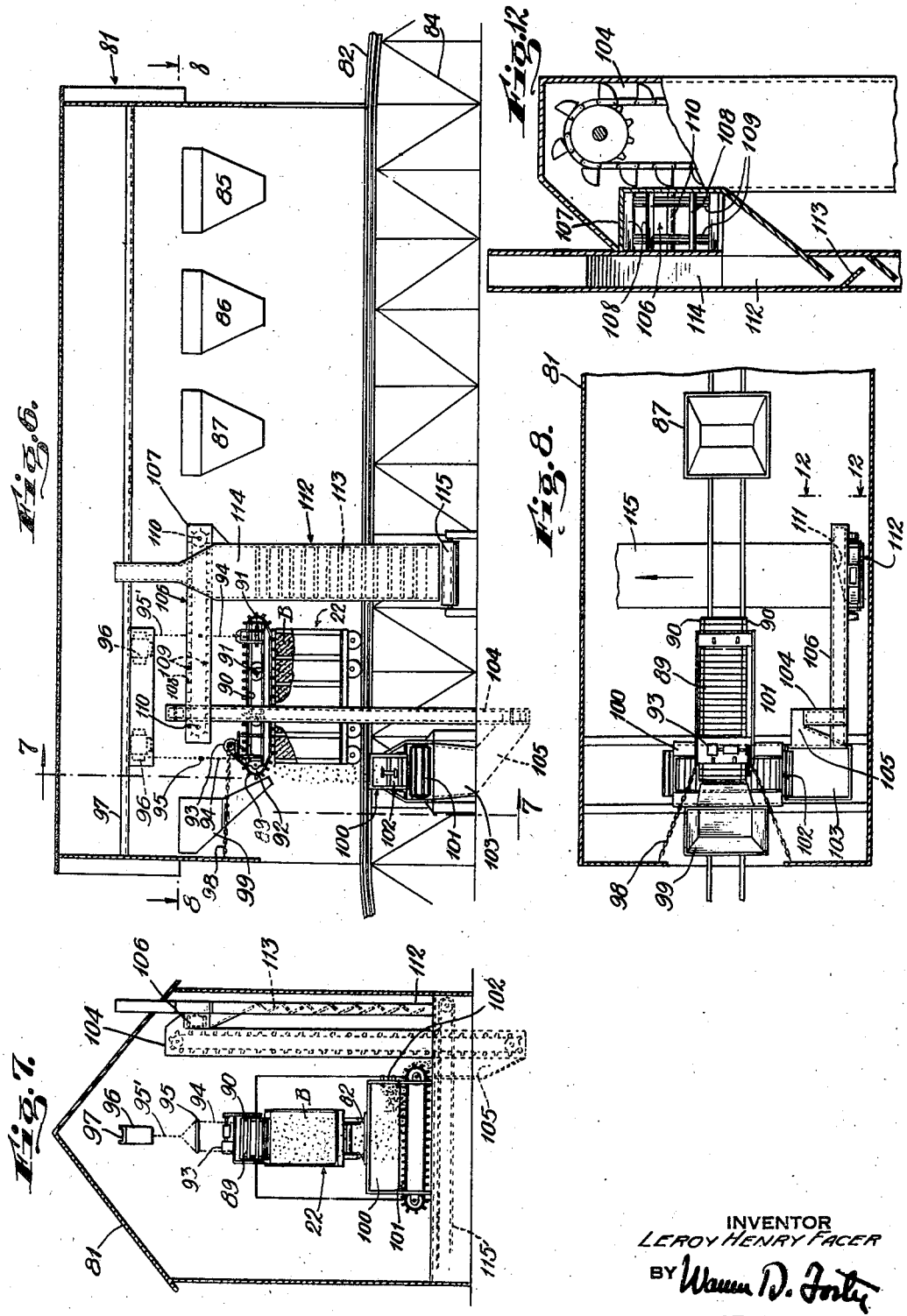

Patented Sept. 3, 1940

2,213,243

UNITED STATES PATENT OFFICE 2,213,243

PROCESS FOR PRODUCING SUPERPHOSPHATE FERTILIZERS

Leroy Henry Facer, Phelps, N. Y., assignor to Facerform Corporation, Ridgewood, N. J., a corporation of New Jersey Application August 27, 1936, Serial No. 98,227

7 Claims. (Cl. 71—40)

This application is a continuation-in-part of my co-pending patent application, Serial Number 709,411, filed February 2, 1934, which upon the 24th day of November, 1936, matured as Patent Number 2,061,567. In said parent patent I describe and claim improved phosphatic fertilizers which are more granular and free drilling than the conventional products, together with methods for producing these improved materials. A primary object of my present invention is to present improvements in both the methods therein described and claimed and also in respect of the mechanisms by which such methods and the improved methods herein described and claimed may be carried out.

As with my parent invention, I may apply this invention to the production of my improved superphosphate alone, or, during the manufacturing process, I may add other fertilizing elements, notably nitrogen or potash, or both, thus producing what is known in the fertilizer trade as mixed fertilizers. I accomplish these results by methods and mechanisms which are even simpler than those described in my parent application.

The end result of the practice of my invention in certain of its forms is an improved granular structure and that of certain other of its forms is an improved and characteristic pelleted structure.

As is common in the superphosphate business, I base the practice of my invention upon the use of phosphate rock mixed with an acid, as for example sulphuric. It is, of course, understood that phosphorus as it appears in phosphate rock is not readily soluble in the soil and hence not readily enough available as a plant food. Acidulation, as has long been well known to those skilled in the art, turns the unavailable phosphorus of the phosphate rock into a form of phosphorus which can be readily assimilated by the plant.

In the practice of my invention, the first step in the production of my improved phosphatic material is mixing phosphate rock and an acid in a pan or mixer in a usual way, preferably, however, with the important exception of using a more concentrated acid than is customary and also by using a more finely ground phosphate rock than is usual.

In the fertilizer art, as practised today, the most finely ground rock in commercial use, so far as I am aware, is of such grade that one hundred per cent will pass through a screen of a mesh of eighty to the inch. Manufacturers have previously attempted to use a more finely ground rock since they have recognized the fact that a finely ground rock increases the speed of the chemical re-action and the rapidity of the assimilation of the acid. These previous attempts with finely ground rock have met with success so far as the chemical processes are concerned since availability has been hastened. The physical characteristics of the resulting material, however, often have rendered it highly undesirable since the product has been even less granular and free running than that which is now conventional in the art. Previously, therefore, this improved step of finer grinding has been impossible except at a prohibitive sacrifice of physical quality. I have discovered that by the use of my process we may employ a finely ground rock thus securing quicker assimilation and the physical quality of the resulting product is even superior to that which I have obtained by the use of rock ground to the conventional fineness. Not only do I secure the advantages of quicker assimilation without any sacrifice of quality, but, on the contrary, my product resulting from a mixture which includes finely ground rock is even more free running and granular than the product which I secure from the coarser rock. The degree to which I grind the rock is determined by economic rather than technical considerations. The saving occasioned by the quicker assimilation must offset the extra cost of the finer grinding. According to my process, I secure a product of the best mechanical condition even though I use a rock ground to the degree of fineness at which one hundred per cent passes through a mesh of three hundred openings to the inch. The amount of the output of a given plant will determine the point between the present conventional size of mesh of the screen and the three hundred mesh screen to which a plant making use of my methods should grind its rock, since extremely fine grinding is economical only in large quantities. In a plant of a capacity of twenty-five thousand tons or less, a grinding operation which produces rock dust of a fineness greater than that at which one hundred per cent will pass through a one hundred mesh screen will probably be uneconomic.

It is to be noted that when superphosphate is made in accordance with my process, the finer the grinding of the rock the coarser the average size of the particles of the end product. So far as I am aware, this rule is the exact contrary of that which obtains in the previous practice.

I wish to emphasize the fact that I am in no way dependent upon fine grinding, and that my invention may be practiced with rock of conventional fineness.

After I have completely mixed the acid and the ground phosphate rock, I pour the slurry mass into a den. If I have used a relatively finely ground rock, I must exercise greater care in the mixing operation to prevent the formation of dust bubbles, as by greater agitation. This greater agitation may be secured by increasing the speed of the mixer and the length of time of the mixing operation or both. In view of the fact that the length of time during which mixing is possible is determined by the setting of the mass and that rapid mixing retards the setting, I find that only by rapid mixing can I effectively increase the duration of the mixing, except by the use of an autoclave. It is to be understood, however, that in my process I avoid the use of autoclaves and other similar expensive equipment. By the use of the term "mixing" I refer to a normal mixing operation which is accompanied by an active chemical reaction between the rock and acid. Such mixing presupposes, especially in the winter, the use of warm acid. By "den" I mean a receptacle which will retain or support this mass until it solidifies into a block.

In practicing many of the steps as taught by the present application, for example the use of a more finely ground rock, I may employ various of the steps taught by my parent application, such as the use of any of the various types of den therein described or the use of various of the steps therein described in respect of the creation or manipulation of the blocks. I may prefer, however, to pour the mixture into each of a series of dens formed upon a car by the use of removable dividing walls. After I have formed the superphosphate into blocks by pouring it into such movable dens, I may leave that block absolutely untreated and untouched, except by the floor and walls of the den, until curing has been completed. By "complete curing," I mean a curing process which has progressed to the point at which it meets the following tests:

1. The chemical reaction between the rock and the acid has reached such a point that no noticeable heat is being generated and the block as a whole has cooled;

2. Availability has reached a high degree, but will slowly increase;

3. Crystallization has sufficiently progressed so that the material upon the disintegration of the block will be characterized by pellet formations;

4. The material, after the blocks have been broken up, when placed upon a pile will not generate noticeable heat.

A literally "complete curing," from a laboratory standpoint, will take an indefinite period and is beyond the scope of a commercial operation. On the other hand, my use of the term "curing" must not be confused with its use by others to mean merely drying the mass, or permitting the mass to dry sufficiently to permit handling by usual mechanical equipment.

As explained in my parent application, I substitute the use of the characteristics of the material itself to accomplish what others accomplish by elaborate and special apparatus or expensive additional steps. By pouring each batch, as explained in my parent patent, within certain predetermined limits of depth, preferably between three inches and three feet, I succeed in trapping a maximum amount of the product of the chemical reaction and thereby building up the heat and pressure within the mass without the use of any special instrumentality. Such limits of pouring are an important step toward the production of my improved product.

By pouring within the above stated limits I secure an initial temperature in the mass of from ten to fifteen degrees higher than the highest den temperature which can be secured with conventional means. According to my methods the initial den temperature is from 230 degrees to 235 degrees as contrasted with the maximum of 220 degrees in the previous process without the use of special mechanical means for increasing or retaining the heat. In this application I make use of temperature readings, always expressed as Fahrenheit, which are taken with an ordinary thermometer of sufficient range thrust into the mass and not with a recording thermometer continuously therewithin. Undoubtedly the temperature readings would be higher with the recording thermometer since the introduction of the ordinary thermometer lowers the temperature somewhat. The temperature figure of 220 degrees as the highest of the ordinary den under conventional practice, however, is an absolute maximum, so far as I am aware, whether recorded by a recording thermometer or otherwise. The figure of 220 degrees represents the maximum temperature obtainable in superphosphate when volatilization is allowed to take place freely. It represents the "boiling point" of superphosphate as definitely as 212 degrees represents the boiling point of unconfined water at sea level. It will of course be understood that temperature and gas pressure increase in proportion.

The insulating quality of the material itself in the particular dimensions of the masses as I pour them retains this increased temperature and pressure merely long enough for it to accomplish its desired result during the initial period during the change of sulphuric acid to phosphoric acid. At this early stage the chemical action is extremely active so that the heat generated is greater than that given off. Concomitantly with the completion of this change, I permit the heat to decrease. Because of the excellent insulating quality of the material itself, the cooling process, although begun relatively early in the operation, may extend over a period of some days.

I secure sufficient insulation to obtain increased temperature while I need it and insufficient insulation to retain that temperature after its presence has become disadvantageous. The presence of increased heat and the absence of continued heat each has a double significance. In the first short period after pouring, increased heat hastens the chemical action thereby quickly increasing availability, but thereafter when the acid has been changed to phosphoric acid it is no longer useful and may even be harmful if too long continued. In order to secure the peculiar improved pelleted structure which renders one form of my product easier to manipulate and more free drilling than the conventional I need this high heat in the early period, but if continued after it has served its purpose it inhibits the completion of the very structure the embryo of which it created. I particularly avoid disintegrating the material before curing is complete and then placing it in large piles since such piles prevent dissipation of the heat which is still being generated.

The ordinary ex-denning operation, which generally takes place a few hours after pouring while the chemical reaction is still active, cools the mass and may reduce its temperature to say 140 degrees at a time when the retention of the heat at or near the original high level is still desirable. Thereafter, according to conventional methods, the material is piled in large masses so that the chemical reaction, which still remains active, creates more heat. This additional heat is not dissipated except very slowly because of insulating qualities of the large pile. The retention of the heat in this large pile is of no benefit chemically and is destructive of the physical qualities which should be conserved in order to secure the best product. Thus it will be seen that under ordinary conventional methods heat is dissipated when it is needed and maintained when it is harmful, while under my methods heat is increased and retained while increased heat is useful and dissipated when it is unnecessary and harmful.

I have found that after each layer has solidified for even the short length of time which is necessary for the mixing of another batch, it is quite ready to support, without damage to the resulting product, the additional weight of successive batches. If, however, each layer is of more than about three feet in thickness, I do not secure my characteristic pelleted formation, probably because the weight is so great that the particles are too firmly pressed together.

My process, as described herein, results in a ratio of availability which is slightly higher than that which is conventional. Moreover, my process is such that I have superphosphate of a given availability ready for use much earlier than under conventional practice, and without the use of special and expensive equipment.

In my parent patent I have given my explanation of the improved results which are obtained by pouring the mixture within the above stated limits, although of course I recognize that an exact understanding of what goes on in the manufacture of superphosphate is necessarily difficult.

In the form of my invention which I am presenting hereinbelow for purposes of illustration, I provide a series of dens upon a car by the use of several sets of removable dividing walls so placed in relation to the side and end walls of the car as to define blocks of the desired size. I place such a car in a filling room. After all the dens are filled, I move the car from the filling room and promptly remove the dividing walls, thus leaving a plurality of blocks of superphosphate, each of which has solidified but not cured, upon the car. I then place the car under a shed and leave it absolutely untouched and untreated until curing is complete, as defined above.

The time at which the material may be disintegrated depends upon various considerations, as pointed out hereinbelow in detail, but five or ten days may be taken for purposes of illustrations. Thereafter the material may be put into a pile, where it will not re-heat, or it may be mixed with other materials.

My process lends itself admirably to the production of mixed fertilizers. I may introduce the ingredients other than the rock and acid which immediately form superphosphate, such for example as nitrogen or potash bearing materials, into the mixing pan prior to the time the slurry mass is poured into the den, as described in my parent patent. I have discovered, however, another and very efficient method for the production of mixed fertilizer. After five days or more, I may move the cars with the blocks thereupon into a dry mixing room. There I may fill the interstices between the blocks with other fertilizing materials or with ground phosphate rock or an inert material. Thereupon I excavate the mass in such fashion that at the same time the mass is thoroughly mixed. It is to be understood that the addition of the additional ingredients, as described above, is optional and while a preferred object of one form of my invention need not be practiced in order to secure many of the results of the invention.

The end result of my invention is a product which has free flowing characteristics, highly prized by both the farmer and the manufacturer who wishes to mix the product, which have not previously been secured by others, so far as I am aware, without an additional and expensive manufacturing step or steps. At the conclusion of my process, the superphosphate, whether alone or combined with other ingredients, is largely in the form of pellets. By "superphosphate pellet" I mean a small, somewhat rounded, mass which is a group of superphosphate granules held tightly together by the material itself. At some point in every process for making superphosphate the material is finely granular or crystalline in structure. Great efforts have been made by many manufacturers to avoid breaking down this granular structure during curing, storage, or other handling. I have retained this granulation and gone a step farther in that I produce a product in which the granules themselves are naturally cemented to other granules, thus producing a much larger pellet than has theretofore been produced by any natural means. Pellets have appeared in superphosphate which has been produced in the past but only as a product of a re-puddling and a re-forming of the mass of fertilizer. In other words, pellets have been secured in the past only by adding an extra and expensive step to the normal manufacturing process. Alternatively, the green superphosphate is stirred and dried in its early stages thereby stopping the curing process and yielding a product of low availability although in coarse pelleted form.

The pellets which I secure without any additional step in the process, however, have very different and superior qualities. This porosity extends to the surface. Pellets secured by my process are more porous, more bulky, and better meet the demands of the trade. All other pellets previously formed in the art have been at the expense of bulk since they have resulted from a compacting of the mass, which is highly undesirable from the standpoint of the trade. According to my method, therefore, I secure better and different pellets than any previously known in the art as the result of the regular steps in my process which are no more in number and are less in expense than those in the conventional processes.

It will be understood that each handling of my pelleted superphosphate tends somewhat to reduce the angularity of the product and to permit fine particles of material which are knocked off in the manipulation to penetrate the open surface pores. Thus, for example, after my pelleted superphosphate has been combined with other fertilizer ingredients, as is hereinafter described, the end product, while still porous and easy flowing, will be somewhat more rounded and of higher specific gravity because of the effect of the later manipulation.

My pellets are of such size that substantially all will not pass through a screen with sixty openings to the inch and approximately two-thirds will not pass through a screen with sixteen openings to the square inch.

Other advantages, objects and characteristics than those stated in the preceding portions of this specification are apparent from the following description, the attached drawings, and the subjoined claims. Although I am showing preferred embodiments of my invention, it will be readily understood that I am not limited to these particular constructions, as changes can be readily made without departing from the spirit of the invention or the scope of my broader claims.

In the drawings:

Figure 1 is a side view, partly in section and partly broken away, of a preferred form of my invention;

Figure 2 is a perspective view, largely diagrammatic and with certain parts omitted for clarity, illustrating a complete plant for the practice of my invention;

Figure 3 is a view, partly in section and partly broken away, of a den structure mounted upon a car which I may use for the practice of my invention, particularly showing a dividing wall unit, the view being taken at right angles to the longitudinal axis of the car;

Figure 4 is an enlarged section, partly broken away, taken on the line 4—4 of Figure 3 looking in the direction of the arrows;

Figure 5 is an enlarged sectional view taken on the line 5—5 of Figure 3 looking in the direction of the arrows;

Figure 6 is a diagrammatic illustration, partly in section, of a dry mixing plant, such as shown in Figure 1, certain parts being omitted for clarity;

Figure 7 is an end view of the dry mixing plant taken on the line 7—7 of Figure 6 looking in the direction of the arrows, certain parts being omitted for clarity;

Figure 8 is a partial top plan view of the dry mixing plant taken on the line 8—8 of Figure 6 and looking in the direction of the arrows;

Figure 9 shows a car bearing blocks of cured superphosphate with other fertilizer material filling the spaces between the blocks and piled upon the top of some thereof;

Figure 10 corresponds to Figure 12 but shows the space ordinarily occupied by one block of superphosphate filled with another fertilizer material;

Figure 11, partly in section, shows an auxiliary car bearing other fertilizer materials for mixing with superphosphate blocks upon a car of the type previously illustrated;

Figure 12 (Sheet 3) is an enlarged detailed view taken on the line 12—12 of Figure 8 looking in the direction of the arrows;

Figure 13 shows a special scraping and raking tool.

It will be readily understood that many phases of my invention as herein disclosed may be carried out with the apparatus and in accordance with the methods disclosed in my parent application. The methods herein disclosed and claimed, however, in certain of their aspects are improvements over those disclosed in my parent patent and the apparatus herein disclosed and claimed may well be used for carrying out either these improved methods or the methods previously set out, or in fact may be used in connection with other methods of superphosphate or other fertilizer manufacture. Also much of the inventive subject matter hereof may be applied advantageously to the handling of other materials and fertilizers, whether dry or moist.

In a preferred form for carrying out my invention, I may provide a filling room 11, preferably placed within another building. Upon the top of the filling room, I mount a dust receiving hopper 12 into which ground phosphate rock is introduced and passed by way of a scales hopper 12' into a mixer pan 13 into which sulphuric or other acid and water are introduced in desired proportions. When I make use of more than one fertilizer material, I may divide the hopper 12 into a plurality of parts, one for each material, and provide additional weighing facilities, or, alternatively and in a preferred form of my invention, I may add other ingredients as is later described and as is shown in Figure 6. If my process is applied to an existing plant which uses a conventional large den, this filling room may be readily formed by slightly reconstructing the old den.

I find that I am able to produce my improved form of superphosphate by using acid of such concentration that shortly after acidulation the moisture content of the mass is as little as $7\frac{1}{2}\%$, but on the other hand, I find that I can secure satisfactory results by using an acid of a concentration which at that time results in the conventional proportion of 12 or $12\frac{1}{2}\%$. I retain the pelleted structure even if the moisture ratio at this time far exceeds these figures, but at the cost of a longer period of drying.

As pointed out above, I also find that I can use a much more finely ground rock than is previously commonly employed in the manufacture of superphosphate. It is to be definitely understood, however, that I am not limited to a more finely ground rock but that I secure my advantageous results if I use rock dust of the usual degree of fineness.

After the mass has been mixed, as is conventional in the art, it may be then introduced by means of a movable funnel 14 into my movable dens, formed as described hereinbelow. Successive pourings of the mixture form blocks B in the dens. The gas from the pan is withdrawn through a pipe 15 leading into the filling room which in turn is exhausted by a fan 16 having an outlet pipe 17.

I may form a series of movable dens 21 upon any one of a plurality of cars generally indicated as 22. The size of the car is determined by economic considerations and those relating to convenience of handling in a given plant. Any convenient number of dens may be formed upon the car by supplying removable dividing structures. For under-framing and trucks, I have found it convenient to make use of the parts from used railway freight cars, but re-assembled and strengthened to carry the greater loads to which I subject them.

Upon whatever under-framing may be preferred, a floor of sheet metal 23 may be constructed. In the preferred form of my invention shown in Figures 3, 4 and 5, I show side walls 24, preferably of heavy sheet metal. A channel beam 25, bolted to the floor 23 and attached to the under framing of the car, supports these walls by means of L bars 26. Reinforcing blocks 27 may extend at the floor between the outside of the walls 24 and the inside of the channel beam 25. The bottom of the walls 24 may be welded to the floor and to the blocks, since extreme rigidity of construction at the point of junction between walls and floor is essential. At such points in the side wall as will determine dens of the desired size, I form vertically extending outwardly projecting grooves or channels generically designated as 28 for the reception of dividing wall structures which, together with the side walls and floor of the car, form each den. Transverse walls, parallel to these dividing wall structures and similar in construction and support, form the ends of the car. As best shown in Figure 5, these grooves or channels may be constructed of two Z shaped members 29 bolted to the walls 24, and a connector plate 30 extending upwardly from the channel beam 25 and forming the outer walls of the channel. The L beams 26 extend only from one of the grooves to another thereof, and their ends 26' may be struck upwardly or an angle iron bolted thereon and bolted to the Z bars 29 one face of which forms one of the side walls of the grooves.

It will be understood that the side walls form two of the four upright bounding surfaces of each one of the individual dens mountable upon the car. To form the other upright bounding surfaces, I provide movable dividing wall structures generically designated as 31 and clearly shown in Figures 3, 4 and 5, which are lowered on to the car and raised therefrom. Each one of these structures consists essentially of a supporting aproned yoke generically indicated as 32, two side walls 33 flexibly attached thereto, and wedges or spreaders 35, likewise attached thereto but fixedly, for forcing the walls 33 into proper position as the dividing structure is being placed upon the car, and for locking them in place and against the slurry masses later poured into the adjacent dens. In the preferred form of the invention which I am herewith showing in detail, I form end walls of the car in the same manner since, for reasons which will later appear, they may be removable, but under certain conditions the end walls may be fixed.

The supporting yoke 32 may consist of an inverted T beam 36, containing openings 37 into which hooks from a chain hoist may be fixed. A channel beam 38 may be bolted to this T beam with its depending sides 39 forming aprons which prevent the superphosphate from entering the space between the walls 33. A U shaped yoke 40 may pass through both of these beams and be bolted or otherwise fixed thereto to support a plurality of sets of chains 41. The other end of each of these chains is attached to one of the walls 33 but with slack, for reasons later explained.

To assist in ventilation between the blocks to be formed upon the cars, ventilating openings 42 may be formed in the floor 23 between the walls 33 closable as by hinged doors 43.

The wedges 35 are directly attached as by angle irons 44 to the yoke 32. These wedges are so formed that as the yoke 32 is lowered they push the walls 33 apart, but are effective only after the bottom of the walls have reached the floor. Guiding plates 46 attached to the inner surface of each of the walls 33 properly direct the wedges 35. To compensate for the tapered construction of the wedges 35 and to maintain all walls locked parallel when they are in position, counter wedges 48 cooperating with the wedges 35 are secured to the walls 33 between the inner surfaces of guides 46. Cross chains 49 prevent the walls 33 of each set from moving far from each other during the lowering or raising operation. Reinforcing bars 50 attached to the bottoms of the walls 33 protect them at the area of greatest likelihood of injury.

I prefer to attach locking lugs 51 with outwardly inclined cam faces to each end of the yokes 32 and to apply cams 52 with a reverse face to the top of the outer surfaces of the grooves 28. At the concluding moment of the lowering operation through the cooperation of these cam faces the yoke and its depending members lock the car side walls to the dividing wall structure and to each other. Therefore, when all these parts are in assembled relation the entire dividing wall structure and the outside walls of the car are locked together so that each reinforces the other, thereby better withstanding the pressure of the slurry masses within the dens.

As the dividing wall structure is raised from its position within the car, the wedges 35 move upwardly a distance which is determined by the amount of slack in the chains 41 before the walls 33 begin to move. In practice this primary movement may be of approximately two and one-half feet. I am not limited to any particular lengh of movement, and give the foregoing figures as illustration only. This movement of the wedges releases the pressure between the side walls and the adjacent blocks of superphosphate by providing a certain amount of free space, in practice say half an inch. Thereupon the action of the chains 41 pulls the walls 33 both toward each other and upwardly, thus first pulling the walls away from the blocks of superphosphate. Thus the dens are first "cracked" and the walls are thereafter removed. During this operation the chains 49 prevent the walls 33 from swinging apart more than a minimum distance. Also, as the cams 51 and 52 are moved apart, the side walls 30 of the car itself, being no longer tied to each other through the dividing wall structure, tend to open outwardly, thus "cracking" the side walls of the car from the blocks of superphosphate.

In considering the lowering operation it must be remembered that the dividing wall structures are heavy, in practice sometimes approaching two tons. As the structure is lowered, the walls 33 reach the floor before the wedges 35 have been forced by gravity to the lower end of their travel. In the final portion of the lowering movement the wedges 35, operating against the counter wedges 48, push the walls into upright and parallel relation. It is to be noted that the wedges and counter wedges force the dividing walls 33 tightly against the corners of the side walls 24 of the car so that none of the slurry mass flows within the grooves 28 during the filling operation. The cam faces 51 and 52 cooperate to lock and reinforce the respective structures. In such cases as the weight of the wedges 35 and the yoke 32 is insufficient to force the wedges completely into position, the bar 55', raised and lowered by a crane, later described, may be made sufficiently heavy to be used as a ram.

It must be remembered that it is highly important that the pressure upon the dividing walls be released before the walls are moved upwardly for any distance whatever. The differential movement produced by the above structure—first the release of the pressure by the upward movement of the wedges, second the movement of the walls toward each other assisted by the pressure of gases from the mass, and third their upward movement—is desirable for an efficient and economically operated structure. Such a movement causes a minimum of shearing of the side walls of the block, the evil effects of which have been described in my parent patent. Also, the unlocking of the two other upright walls of the den by the movement of the cams 51 and 52 out of relation with each other is important in this connection since the said upright walls thereupon may slightly spring apart thus "cracking" them from the adjacent superphosphate.

This differential movement of the dividing walls represents an improvement over the subject matter of certain of the forms of the invention shown in my parent patent.

The cars 22 may be operated upon a track 53 which extends from within the filling room 11 through a doorway 54 and underneath a crane, as shown in Figures 1 and 2 and illustrated in detail in Figure 1. The purpose of the crane is to raise the dividing wall structures from the filled car and lower them into a car waiting to be filled. Hook members 55 are attached as by a bar 55' to a cable 56 which may be wound upon an electric winch 57 operated by a motor 58 placed upon a car 59 which runs upon a track 60. This track 60 depends by supports 61 from I beams 62 joined by I beams 63. The car structure formed by the I beams 62 and 63 operates upon wheels 64 which run upon rails 65 which are supported by I beams 65' mounted upon upright beams 66. Motors 67 move this entire crane structure in directions at right angles to the track 53, while the car 59 driven by a motor not shown is operable to move the dividing wall structures in a direction parallel to the longitudinal axis of these tracks.

The operation of this form of my invention is as follows:

The ground rock passes from the storage hopper 12 to the scale hopper 12' and into the pan 13 where it is mixed with acid. Other fertilizing materials may also be added to the pan. The rock is preferably but not necessarily finely ground, as previously stated. As soon as the mixing operation is complete, the slurry mass is poured into one of the dens formed upon the car 22. It is of course understood that the dividing wall structures 31 are in place. By filling this den with as many batches as are convenient, I form a block of superphosphate therewithin. Preferably each batch has a depth when poured of between three inches and three feet. I find one foot an advantageous depth for each batch, in view of the capacity of the average mixer in relation to the size of the block and the resulting product. Thereafter the other den or dens upon the car are likewise filled, the movable spout 14 being swung from one den to another. For purposes of illustration, I show a car with five dens, but it will be understood that economy of handling will determine the size of the car and hence the number of dens which are to be placed upon each car. Alternatively, a fixed spout may be employed and the car may be moved after each den is filled. The filling room should be sufficiently large to hold at least one car. After all the dens formed upon the car are filled, the car is pulled out of the filling room and under the crane and another empty car with the dividing walls already in place is immediately moved within the filling room and the process is repeated. Thereupon the crane picks up the dividing wall structures from the filled car and places them in position to form dens upon a third and empty car. This third car is placed within the filling room for filling after the second car has been filled and removed from the filling room. Thereafter, these steps are indefinitely repeated. It will be understood that the superphosphate is sufficiently solidified to permit the walls to be removed, beginning immediately after each car is taken from the filling room. As the sets of dividing wall structures are removed, blocks of superphosphate remain on the cars, with air spaces between.

The first car, with the blocks of superphosphate in place but with the dividing walls removed, is thereupon moved along the track 71 and along one of the tracks serving the sheds 72. These sheds form merely a protection for the top of the block to keep off the rain. If desired, a suitable hinged roof may be supplied for each car and the cars may thereupon remain upon a storage track with no protection whatever other than the protection afforded by the roof of the car. After the curing is complete, the cars are thereupon moved, according to one preferred form of my invention, to a dry mixing building 81, the interior of which is shown purely diagrammatically in Figures 6, 7 and 8. The doors 43 closing the ventilating openings 42 may be opened so that a current of air flows between the blocks during the curing operation. Convection will cause a rapid air movement of large volume. Even if no door is provided or opened, I have found that the air movement is rapid.

The movement of the cars along the track may be by any usual means, such as a locomotive or car puller. When large cars as of three trucks are used, car ferries or transports may be employed to move the cars laterally to the longitudinal axis of the tracks, thus conserving space. Since such car moving means are conventional, I am not illustrating them.

As previously pointed out, fertilizer ingredients other than superphosphate may be introduced into the pan. If desired, however, this introduction may be made after the car 22 with the blocks of cured superphosphate thereon has been placed upon a track 82 upon a trestle 84 within the dry mixing building. It is understood that the dividing wall structures long previously have been removed. The ventilating doors 43 are closed. The car may be stopped under any one or more of the hoppers 85, 86 or 87 and an additional fertilizer, such as potash or nitrogen, or additional phosphorus, or other material, may be introduced as from these hoppers into the spaces between the blocks of superphosphate. Also, if I need a larger admixture of material in dry form than can be accommodated between the blocks, I may pile the excess C on top of the blocks, as is illustrated in Figure 9, or I may fail to form a block in a central den and fill the space which otherwise would be occupied by the block with this added material D, as illustrated in Figure 10.

If I desire to bring the available phosphoric acid content of the blocks to a given or standard point higher or lower than that of their content after curing, I may introduce a dry phosphorus bearing material or an inert material.

If I desire to change the available phosphorus content of the block, as to make superphosphate 16-20, for example, I may introduce raw ground rock within the interstices between the blocks or above them. Also, if desired, sand or any other inert material may be so introduced. To increase the available phosphoric acid, I may introduce double or triple strength superphosphate.

As the car 22 reaches the point at which it is shown in Figures 6, 7 and 8 of the drawings, I may lower an unloading machine upon the top of the blocks. It will of course be understood that at this time one or both end walls of the car have been removed. This unloader preferably is approximately of the full width and at least the full length of the car, but under certain circumstances its width may be much less than that of the material being excavated. The digger consists of flights 89 which travel upon chains 90 passing over idling wheels 91 and a power-applying wheel 92 driven by a motor 93 belted thereto. The whole unloading structure may be raised and lowered as by cables 94 depending from a yoke 95 attached as by cables 95' to motors 96 which are supported as from a beam 97 at the top of the building.

The length and weight of the claims 90 is such that the portion underneath the carriage extends a considerable distance therebelow in an arc. The carriage is lowered only sufficiently for the flights to ride upon the full length of the top of the material. Only the weight of the chains and the power applied thereto cause the flights to rake and scrape across the material. In no case does the weight of the carriage ride upon the chain or the material being dug. The chain as it passes above the carriage is supported thereby and in such manner that the entire slack falls below the carriage. Chains 98, or alternatively hooked rods, attached to a fixed portion of the building, prevents the digger from "walking itself" out of the mass which is being handled. As the chain 90 moves in clockwise direction, as viewed in Figure 6, the materials will be scraped from the top of the several blocks and from the top of the interstices between the blocks, if these have been filled with material D, as previously pointed out. As the digging operation is continued, the digging machine is gradually lowered.

As the chain revolves, the flights make a raking or scraping movement over the entire length of the top surface of the mass. The material as it is scraped off the top of the mass or masses rolls over and over ahead of each flight. In its forward movement the flight first digs out a small amount of the material and forces it upwardly and forwardly ahead of itself. There is nothing to move this material further forward until the flight overtakes it a moment later. By that time, however, still further material is being dug and forced forwardly and ahead of the flight and hence into collision with that previously excavated. The foregoing explanation is believed to account for the rolling movement which the flights set up, this movement being very effective as a mixing operation and accounting in large part for the efficiency of the apparatus. Also, as this material increases in amount, a portion of it drops behind the flight which scraped it off and is picked up by the succeeding flight and again subjected to a rolling and mixing movement. It must be particularly noted that the material itself forms the trough in which the flights work. The succeeding flights ride in part upon the top of the material which has been excavated and dropped by the preceding flights and in part upon new material.

As each flight, held down only by its own weight and the weight of the chain, picks up the material previously loosened, it mixes the particles of that material more thoroughly with themselves and also with the material which it then freshly digs.

Each succeeding flight penetrates slightly more deeply. Each flight penetrates to substantially the same depth in any one movement across the mass. Each scraping and raking movement carries along substantially proportionate amounts of each stratum of the materials. The operation is one of tearing, raking and scraping and not of crushing, whether by hammer, roller, or other blow creating device.

I have found it useful to use a few toothed flights between the solid flights, these toothed flights preferably being inclined somewhat forwardly and penetrating slightly more deeply than the solid flights. Toothed flights, particularly in gummy or hard material, tend to loosen the material so that the following solid flights can better carry on the mixing and conveying operation.

Adjustment by means of one of the cables 94 maintains the effective portion of the chain level.

It will thus be understood that the digging operation also serves effectively as a mixing operation in those cases in which I introduce additional material. In those cases in which I pile material upon top of the blocks, I may tilt the carriage of the digger in order to take relatively more from one area than from another. The diagonal relation of the carriage to the blocks makes it possible to include desired amounts of the superphosphate and of the other materials.

If the operator uses material which has been held in the block until it has become dry, as, for example, after ten days, he may use any conventional and effective unloading device, although the novel one which I have described hereinabove possesses many advantages irrespective of the condition of the material to which it is applied. If, however, the operator wishes to unload and disintegrate blocks while they are still moist and high in free acid, as, for example, those which have remained in the block for only five days, it is necessary to employ a mechanism which will satisfactorily handle material in this condition. At five days my blocks of superphosphate have already matured their characteristic structure, but if blocks at the five-day stage are continuously passed through conventional disintegrating and screening equipment, the material will gradually adhere to the equipment and build up in such fashion that after a time it renders it practically inoperative. The digger, however, which I have described hereinabove, is effective not only to unload the car effectively and at the same time to mix the other added ingredients and the superphosphate from the block, but also thoroughly to disintegrate the entire mass and break it up into particles which do not require screening. That is to say, this digger combines the functions of an excavator and unloader with those of a disintegrator and a mixer and a screening device.

If desired, the digger may be made of less than the width of the car and moved laterally within the car. It will also be understood that this mechanism may be advantageously applied to many unloading and trimming operations outside of the fertilizer art. It is particularly useful in the unloading or loading of bulk material to or from cars or the holds of ships, or any other confined space, particularly in such cases as a trimming operation must be included. In such cases, I supply reversible motive power. It is also particularly useful in simultaneously conveying and mixing, whether or not a disintegrating action is also necessary, a plurality of different materials placed in closely adjacent upright strata. It will satisfactorily mix and convey materials of differing sizes and specific gravity and also materials which are gummy or sticky. It is well adapted as a mixer and a conveyor to small concerns which mix bases, as described elsewhere herein, without disintegration.

The strata formed by a plurality of materials to be handled by my digger must stand generally upright so as to present top surfaces to the digging, mixing and conveying operation, but they need not be perpendicular. The upright walls of each stratum must be parallel, however, if the mixing operation is to be uniform. In the subjoined claims by my use of such phrases as "upright stratum" I mean a stratum that extends in a generally upright direction, not necessarily perpendicular, so that it presents its top surface to the digger.

I may secure substantially the same result as described above by a manual operation by the use of a special scraper shown in Figure 13. A body portion R ends downwardly in an inclined serrated edge R1. A handle R2 is supplied. With such a tool, a laborer makes successive movements of substantially equal downward penetration over the exposed top sections of the materials in the car, each such movement performing a digging scraping mixing conveying and unloading operation. The laborer presses downwardly as need be as he scrapes. He delivers the successively scraped material at the end of the car.

For use in such cases as I wish to add a dry free running ingredient at the point at which the car is being unloaded, I may use a hopper 99 from which to direct a stream of such material into the superphosphate mixture.

As shown in the drawings, the material as it is being unloaded falls into a hopper 100 from which by a suitable conveyor 101 it is moved through a measuring gate 102 into an ammoniator 103. The material is passed from the ammoniator to an elevator 104 to the boot of which it is delivered from the ammoniator by a chute 105. The elevator 104 carries the material to a transverse conveyor 106 which comprises a tight box-like structure 107, into which the material falls, and flights 108 operated by chains 109 driven by sprockets revolved by a shaft 110. See Figure 12. Preferably the material falls to the bottom of the box 107 whence it is scraped by the flights 108. The flights deliver it to an angular opening 111 at the top of an aerator 112. Attention is particularly directed to this opening. I so shape this opening that the material as it is moved by the conveyor thereover is dropped evenly over the cross-sectional area of the aerator. As the material falls it strikes fins 113 which retard the fall and tend to permit the air more thoroughly to mingle with the particles of fertilizer. If desired, an upwardly moving counterblast of air may be employed to further the process of aeration. The areas 114 operate as a dust collector at the top of the aerator above the point of the admission of material to be aerated. The aerated material may be removed as by a belt conveyor 115. It will of course be readily understood that I am not restricting myself to any particular type of apparatus for handling or aerating the material but am merely showing illustrative forms. It is particularly to be noted that the process of aeration is necessary only to remove the water vapor which follows ammoniation. I wish particularly to emphasize that aeration is not necessary at any step in my production of superphosphate. In case I do not use the ammoniator, I may pass the material through the same path, but merely as a convenience in handling, or I may employ a by-pass.

As shown in Figure 11, I may provide an auxiliary car 145 to bear fertilizing material 146, if desired of a plurality of kinds indicated as E and F, to be added to the superphosphate blocks B as previously described. This car may include a fixed rear end wall 147, a removable front end wall, and removable intermediate dividing walls if desired. These dividing walls may be constructed as previously described for those of car 22, although a double wall is not necessary. Alternatively to the above construction I may employ one of my regular cars 22.

After the car 22 bearing cured blocks of superphosphate is placed in position ready for unloading, I may place behind it the car 145 with one or more fertilizing materials each of a vertically extending stratum of the same height as these on the car 22 which I wish to combine with the blocks of superphosphate. The compartments of this car may be filled from the hoppers 85, 86 or 87, or in any other desired or conventional manner. The front wall is necessarily removed after car 145 has been placed close to car 22 and the dividing walls may be removed at any time prior to the operation of the digger. It will of course be understood that the rear wall of the car 22 must have been removed. Thereupon the material is unloaded, disintegrated and mixed by the operation of the unloader as previously described, except that the unloader must be sufficiently long to be operative along the full length of both the car 22 and the car 145. In this operation the longitudinal axis of the unloader is parallel to the bottom of the car.

A great advantage of this form of my invention is that the fertilizer material to be added may be other than free running, as is the case in the majority of materials. Another advantage is that I am not limited to the amount of material, necessarily small, which may be placed between the blocks or piled on top of them. Materials can readily be mixed with superphosphate by this method which cannot be so mixed by any other method known to me. This method of mixing is more facile than the use of the hopper 99 which must necessarily be restricted to relatively free running material. It is also much more accurate in determining the content of the end mixture. This type of two-car disintegrating and mixing obviously is adapted to a large plant. It is of course evident that the above operation is economical as well as efficient.

I may use my auxiliary car alone in connection with the digger. In certain of such instances I may dispense with movable dividing walls and permit the average angle of repose of the materials which I desire to mix to determine the configuration of the different strata. In such instances I incline the rear wall of the car from rear forwardly to agree with such average angle. I place the first material to be mixed at the rear of the car upon such inclined wall which thereupon forms one of the upright sides of said stratum. The forward upright inclined wall is roughly parallel thereto and is determined by the average angle of repose of the material. A slight amount of hand trimming may be applied to the outer surface in order to make it more nearly parallel to the end wall of the car and to the top surface to level it off. Thereupon other materials are deposited upon this inclined face of the first stratum and trimmed if desired, and so on until the desired strata are formed. Thereupon, the digger is applied across the top surfaces of all of the strata, as previously set out.

My method of mixing results in a uniformity which is at least as great as that ordinarily achieved and in some cases greater. Its economy and convenience are obvious. The present methods of hand weighing of small individual batches of material, as ordinarily practiced, are far from accurate.

One of the major advantages of my invention is the elasticity which it provides. I may readily adapt my methods to existing plants of different kinds as well as to plants which are built especially for it. In any case, I am able to maintain a balance between technical and economic demands.

This adaptability of my invention to various conditions may be illustrated by an explanation of certain of the major forms in which it may be practiced.

The blocks may remain upon the car for five days. At this time they will have cooled throughout to atmospheric temperature. I then may move the blocks into the dry mixing room for the addition of dry materials. In the seasons of the year when the fertilizer plant must operate to full capacity, I may choose to ammoniate the superphosphate at this point, but at the expense of some loss in available phosphoric acid. Dry mixing after five days of curing presents no disadvantages of any kind, assuming of course that alkaline materials, such as lime for example, are not added. Under certain conditions, particularly in view of the seasonal nature of the fertilizer business and with an abundance of conventional storage space already available and capitalized, it may be desirable to disintegrate and store the blocks in conventional piles at this point. In such cases the material will not re-heat and my characteristic structure will be maintained. Another handling, however, will be necessary when the material is removed for dry mixing. Another possibility under the second form of my invention is that I may store the material in the broken block pile. The choice between this possibility and one of the foregoing is economic.

Another and much preferable form of the practice of my invention, particularly in a new plant, is to permit the blocks to remain upon the cars for a period of ten days. By this time the availability has increased from the point which was reached at the end of the five-day period to the highest point which under ordinary conditions is commercially practicable. At this point I may make any one of the four following different uses of the material:

First, other dry fertilizer ingredients may be mixed with my blocks to produce a standardized two-part or complete fertilizer. Thereupon, because of the new reaction caused by the addition of these new ingredients, the mixture must be placed in the pile and remain there until this reaction has been completed. It is to be distinctly understood that this reaction has nothing whatever to do with the original production of the superphosphate as such and that its pelleted structure will not be in any way impaired thereby.

Second, I may ammoniate, with or without the addition of other dry materials, such as those bearing nitrogen or potash, and aerate as described above. In this instance I may bag at once since the second reaction and cooling are completed during the ammoniation and aeration. Again I call attention to the fact that this second reaction with its need for aeration has nothing to do with the making of the superphosphate.

Third, I may sell the material either before or after disintegration, after ten days to other mixers as cured run of pile. As is well known in the art such cured run-of-pile will be mixed with other materials to produce mixed fertilizers.

Fourth, following the usual standardization necessary with any cured run of pile, which necessarily includes disintegration, I may store through the slight secondary reaction and sell as superphosphate in a form suitable for delivery to the consumer.

I am able to make an election from among the possibilities stated above and to determine the minimum time after which I disintegrate a block of superphosphate by the application of a definite rule. In the fertilizer industry, it is conceded that a sixty-day curing or storage is the maximum which is ordinarily practicable. If I permit my blocks to remain intact and untreated for that period, I find that I have an available phosphoric acid content of 18.50%, taking an average of several hundred analyses based upon phosphate rock of a content of 68% bone phosphate of lime. If I disintegrate at seventeen days, I have so found that I have 18.35% available phosphoric acid; after ten days 18.14%; at seven days 17.83%; after five days 17.38%; and after one day 16.79%. The foregoing figures are based on a run-of-pile formula but the ratios remain practically constant irrespective of the formula. I am assuming a production of 18.50% available phosphoric acid at the end of the sixty-day period as the maximum which is practical to produce, or 100%. I find, therefore, that at the end of the first day I have an available phosphoric acid content of approximately 90.8% of the practicable maximum, at the end of the fifth day 95.8%, at the end of the tenth day 98.1% and at the seventeenth day 99.2%. Taking the above figure of 18.50%, which represents the available phosphoric acid at the end of the sixty days, as the optimum, I can readily determine the figures at the other periods which represent the then insoluble phosphoric acid which later becomes, or may become, available. These figures obviously are the difference between 18.50% and the various percentages of available phosphoric acid ranging from 16.79 to 18.35 stated above. When I evaluate this insoluble phosphoric acid which by a longer curing can be made available, I find that on a basis of forty cents per unit if I disintegrate at the end of the first day I lose sixty-eight cents per ton; at the end of the fifth day forty-five cents per ton; at seven days twenty-seven cents per ton; at the end of the tenth day fourteen cents per ton; and at the seventeenth day six cents per ton.

With the above figures before him, the superphosphate operator can readily determine the point at which the saving by making more phosphoric acid available by a longer curing overcomes the additional cost which is necessary in order to secure this longer curing. On the basis of an average cost for the cars, together with the storage track necessary for each, I find that the cost per ton for enough equipment to effect the five-day cure is $.139. This figure plus $.27, the value of the loss in phosphoric acid which might become soluble in sixty days, gives a total of $.409 as representing the burden of disintegration after a five-day cure. The equipment which will be necessary for the ten-day cure costs $.217 which plus $.14 for the loss of the insoluble which would later become soluble gives a total burden of $.357. If we maintain the block intact for seventeen days, the equipment will cost $.333 which added to the loss of the insoluble which would later become soluble at $.06 gives a total burden of $.393. From the foregoing figures, it becomes evident that the additional cost of the equipment is warranted for the ten-day cure since there is a net saving of over five cents per ton but that the longer seventeen-day cure results in a loss of almost four cents per ton, the saving of eight cents per ton in the value of the phosphoric acid being offset by the additional capital cost of twelve cents per ton.

The above figures are illustrative only and will not apply definitely for many locations and combinations of circumstances but they clearly indicate the method by which a fertilizer manufacturer who wishes to practice my methods under any given set of conditions can definitely determine for himself upon a basis which is scientifically and economically sound the point, expressed in terms of time, to which he should carry his cure. So far as I am aware no previously proposed practicable method of superphosphate manufacture permits equal freedom of choice to the manufacturer and at the same time gives him a definite check upon the election which he should make.

It is of course well understood by those skilled in the fertilizer art that any run of pile superphosphate which is to reach the ultimate consumer as superphosphate and not in the form of a mixed fertilizer must be standardized in order to meet a specific analysis. My process very much simplifies this standardization and under certain circumstances eliminates it entirely as a separate step.

In all types of superphosphate manufacturing known to me, each run of superphosphate is heaped upon that produced in previous days thereby creating a large mass of material portions of which vary many days or even weeks or months in time of curing. As this material is excavated, individual batches, because of conveying and excavating methods commonly in use contain superphosphate of varying degrees of curing, with the more completely cured material on the bottom and on the inside. Moreover, the atmospheric conditions obtaining while one portion of any one pile was originally made may be very different from those obtaining while another portion of the same pile was being made, yet the excavating machinery necessarily cut through the stratified layers and removes consecutive batches the degree of cure of each of which irregularly differs from that of the others. Other variants in a given plant include differences in the time which elapses after pouring and before ex-denning, the size and weight of the pile as it progressively increases, the amount and depth of the material which is added to the pile each day, the size and weight of the ultimate pile, the time it is left undisturbed, the number and character of each handling, such as turning over, and the proximity to other warm material. Differences in the size of piles result in different degrees of heat and pressure and cause varying results in the mechanical condition of the product.

Under my system, however, I am able to produce a result which is completely uniform, both as to availability and mechanical condition, except upon one point, and that one point is subject to relatively easy control. Each one of my blocks is made up of a series of pourings made consecutively and within short time intervals. Each block is maintained as a homogeneous unit until final disintegration. The blocks are maintained under uniform conditions of temperature and humidity since they are stored adjacent each other so that the heat and moisture given off from the blocks themselves, tend to maintain uniform conditions surrounding them. It will therefore be seen that I am handling uniform material in relatively large homogeneous and uniform units under uniform conditions.

I have removed, therefore, all of the variables except one. The one remaining variable is the ratio of bone phosphate of lime to the rock which is used. As is well known in the fertilizer art, this content may differ between each car-load or ship-load. After the blocks have been formed as above from any given lot of rock, the operator can readily take samples from each block and determine the amount of phosphorus which will become available at the end of the period, of say five or ten days, at which he has decided to disintegrate. Such definite check is impossible with superphosphate made according to conventional methods and stored in large piles. When each one of my cars, therefore, with its previously definitely known analysis of the blocks thereupon, is brought into the dry mixing room, I am at once prepared to add to those blocks the amount of additional phosphorus necessary to bring the phosphorus content of the blocks up to the required standard or the amount of inert material required to reduce the available phosphoric acid in case it runs above the standard. No such simple expedient is possible under any other method of superphosphate production known to me.

As the end result of much of the product produced as hereinabove described, I may wish to form a very few standardized bases. For purposes of illustration I may wish to form a high nitrogen base which I call for convenience a 1-2 base—that is to say, a base containing one part of nitrogen and two parts of available phosphoric acid. I also may wish to form a low nitrogen base called by me for convenience a 1-6 base—that is to say, a composite material consisting of one part of nitrogen to six parts available phosphoric acid. This base is particularly convenient since it represents the ratio in which anhydrous ammonia can be added to superphosphate with a minimum of loss. I may add potash to either of these two bases in desired proportions, this addition being made during the manufacturing operation as hereinabove described without the taking of an additional independent step.

I have found, however, that if I supply the small local, dry mixing plant which distributes mixed fertilizers directly to the farmer with my two standardized free flowing bases, pelleted superphosphate, and a potash bearing material, such as muriate or sulphate of potash, I place that plant in a position with a minimum of equipment, experience and capital to manufacture all of the mixed fertilizers which are commonly required by its farmer customers. All of these four materials can be dry mixed without difficulty with very rudimentary and inexpensive equipment and little knowledge of the technique of the fertilizer business. I am able to put such a plant in a position to secure these results only because of my economical production of standardized bases which are made up of my peculiar free flowing material. It is to be understood also that in those relatively few cases in which the individual farmer wishes some particular fertilizer material, such as organic ammoniates, or nitrate of soda, these materials can be successfully combined by the local mixing plant with my free running bases without the necessity of an additional cure.

As will be understood from my parent patent and from a reading of the foregoing portion of this specification, I accomplish my improved results by so manipulating the material as to take advantage of its inherent characteristics. I do not require the use of expensive and complicated equipment, such as autoclaves, pumps, dryers, dusting machines, re-heating appliances, and the like. I secure either a granular or pelleted superphosphate either alone or in combination with other fertilizer ingredients. The availability of my product in a given time is higher than that made by conventional methods. I also complete the manufacturing processes within a much shorter time and at a lower cost than is possible under the conventional methods. My processes produce products well adapted for standardization and for sale either as superphosphate or in combination with other materials as standardized bases or as mixed fertilizers. I make large use of existing equipment and adapt whatever special equipment I need to the economic and physical conditions prevailing in a given plant.

The present invention represents simplification of mechanisms and processes and also presents important and novel steps in respect of the handling of a plurality of materials, particularly to produce standardized bases.

Other advantages of my invention will be evident from the foregoing portion of this specification, the attached drawings, and the subjoined claims.

I claim:

1. A method of manufacturing mixed phosphatic fertilizer which comprises placing relatively thick removable dividing walls within a filling space, mixing ground phosphate rock and an acid, pouring successive batches thereof within one of the plurality of dens so formed within said filling space and thereafter pouring successive batches into another of said dens, removing said walls after the material so formed has solidified, thereby leaving spaces between the separate blocks which have been formed within the filling space, filling said spaces with another material which it is desired to mix with the superphosphate, concomitantly excavating said superphosphate and said other material thereby mixing the same, and delivering the excavated and mixed material to a common point.

2. A method of producing mixed phosphatic fertilizer which comprises placing removable dividing walls each of considerable width within a filling space, mixing ground phosphate rock and an acid, pouring successive batches thereof within one of the plurality of dens so formed within said filling space and thereafter pouring successive batches into another of said dens thereby forming blocks, removing said walls after the blocks so formed have solidified, filling the space between said blocks with another material which it is desired to mix with the superphosphate, thereafter ex-denning said superphosphate and simultaneously mixing said other material with said superphosphate by scraping uniform amounts by successive strokes each of an approximately uniform depth entirely across the tops of each of said blocks and the material placed therebetween thereby forming a mixture of said superphosphate and said material, and delivering the excavated and mixed material to a common point thereby in one operation both conveying and mixing said materials.

3. A method of producing a mixed fertilizer which comprises placing upon a car upright and immediately adjacent strata each of approximately the same height and composed of different fertilizer materials, placing a stratum of the same height upon another car adjacent an end thereof, placing said cars in close end-to-end relation to each other, with the end of said second mentioned car adjacent which said stratum is placed being disposed adjacent said first mentioned car, removing the adjacent end walls, and making a series of scraping movements of approximately the same downward penetration completely across the tops of all of the materials in both cars, thereby at each movement in one unitary operation thoroughly mixing said materials and drawing to a common point predetermined percentages of said materials.

4. A unitary method of conveying and mixing a plurality of fertilizer materials at least one of which is not free flowing into a mass of which each material forms a predetermined proportion which comprises forming immediately adjacent aligned strata each of approximately the same dimensions in two planes, and making a series of scraping movements parallel to the third of said planes and completely across all of said strata at each of said movements and of uniform penetration into the materials of the respective strata, thereby at each movement drawing to a common point predetermined percentages of each of the materials making up said strata and at the same time thoroughly mixing said materials in the one unitary operation and maintaining each of said scraping strokes of an approximately uniform penetration by moving the scraping instrumentality so that it penetrates the mass a predetermined distance as the scraping operation proceeds.

5. A unitary method of mixing and conveying a plurality of materials at least one of which is not free flowing into a mixed fertilizer of which each material forms a predetermined proportion which comprises placing each of said materials in distinct aligned and immediately adjacent strata, making a series of continuously scraping movements across the tops of all the strata, utilizing solely the weight and inclination of the scraping instrumentality to determine the depth of penetration of each stroke, and depositing the materials so scraped at a common point thereby at the one operation both conveying and mixing the materials.

6. A unitary process of conveying disintegrating and mixing a plurality of different fertilizer materials some of which are in finely divided form and others of which are in coherent block form into a mixed fertilizer of which each material forms a predetermined portion which comprises placing said blocks a distance apart which is predetermined in accordance with the quantity of finely divided materials which it is desired to place in said mixed fertilizer thereby providing in effect the end walls to confine said finely divided materials, providing side walls extending between said blocks thereby completing enclosures for said finely divided materials, placing said finely divided materials into the enclosures so formed, making a series of scraping movements across the tops of said blocks and of each of said masses of finely divided materials therebetween, each of said scraping movements being of substantially uniform penetration, and drawing the materials so disintegrated and mixed to a common point.

7. A unitary method of conveying and mixing a plurality of different fertilizer materials at least one of which does not flow freely into a mixed fertilizer of which each material forms a predetermined constituent proportion which comprises placing each of said materials in distinct immediately adjacent aligned strata of uniform height and width, the length of each stratum being such that the material in said stratum is proportional to the relative amount thereof which is predetermined as a constituent of said mixed fertilizer, and making a series of continuous scraping movements each of approximately the same downward penetration across the tops of all of the strata along the lengthwise dimension of the top thereof, and depositing the materials so mixed and scraped at a common point thereby in one operation both mixing and conveying said materials.

LEROY HENRY FACER.